9/16/86 OR 4,612,240

United States Patent [19]

Johnson et al.

[11] Patent Number: 4,612,240

[45] Date of Patent: Sep. 16, 1986

[54] THERMALLY MATCHED COATINGS FOR CERAMIC FIBER INSULATION

[75] Inventors: Thomas A. Johnson, Lynchburg; Charles A. Hill, Amherst, both of Va.

[73] Assignee: The Babcock & Wilcox Company, New Orleans, La.

[21] Appl. No.: 721,505

[22] Filed: Apr. 11, 1985

Related U.S. Application Data

[63] Continuation-in-part of Ser. No. 564,435, Dec. 21, 1983, abandoned.

[51] Int. Cl.[4] .......... C04B 35/14

[52] U.S. Cl. .......... 428/289; 427/427; 428/283; 501/128; 501/133

[58] Field of Search .......... 501/133, 128, 95; 428/289, 283; 427/427

[56] References Cited

U.S. PATENT DOCUMENTS

| | | | |
|---|---|---|---|
| 3,231,401 | 1/1966 | Price et al. | 501/128 |
| 3,920,578 | 11/1975 | Yates | 501/133 |
| 4,041,199 | 8/1977 | Cartwright | 428/283 |
| 4,090,881 | 5/1978 | Keel et al. | 510/95 |
| 4,174,972 | 11/1979 | Drouzy et al. | 501/124 |
| 4,508,835 | 4/1985 | Kaniuk et al. | 501/133 |

*Primary Examiner*—Helen M. McCarthy
*Attorney, Agent, or Firm*—Robert J. Edwards; Mark B. Quatt

[57] ABSTRACT

A fiber-free refractory coating composition consisting essentially of an aluminosilicate mineral selected from the group consisting of kyanite, andalusite, and sillimanite; alumina; colloidal silica; and water. This mixture is characterized by good adhesion to substrate material, and excellent resistance to thermal shock and chemical attack through a wide range of firing temperatures up to 3000° F.

3 Claims, No Drawings

THERMALLY MATCHED COATINGS FOR CERAMIC FIBER INSULATION

This application is a continuation-in-part of copending application Ser. No. 06/564,435filed Dec. 21, 1983, abandoned.

BACKGROUND OF THE INVENTION

The invention relates to coatings to be used on ceramic fiber insulation, and more particularly to such coatings which are resistant to severe thermal shock and chemical attack.

Ceramic fiber insulation is currently used as a high temperature lining for the interior walls and ceiling of furnaces and kilns. This insulation takes many forms, including blanket, felt, board, and modules with end strip and pleated configurations. Such materials have excellent insulating properties and are resistant to thernal shock, i.e. rapid changes in temperature.

However, ceramic fiber insulation is fragile and susceptible to corrosive attack by chemicals such as compounds of sodium, boron, and iron. This insulation is also susceptible to the erosive effects of fine particulate matter entrained in high velocity gases typically present in many furnace environments. Fuels such as natural gas, oil and coal produce carbon dioxide, carbon monoxide, water, hydrogen, hydrocarbons, carbon particles, and entrained ash particles. To meet the need for protection of ceramic fiber insulation, various coatings have been developed. These coatings are typically blends of ground ceramic fiber and binders. U.S. Pat. No. 3,231,401 (Price et al) shows a combination of a ceramic fiber with an aqueous dispersion of colloidal inorganic oxide to produce a thermally shock resistant refractory coating or adhesive useful to about 2300° F. By making the coating out of the material to be coated, the problem of thermally matching coating to substrate (i.e. the surface of the underlying ceramic fiber insulation) is essentially eliminated but at great economic expense.

A major disadvantage of ceramic fiber-based coatings is their high cost. Ceramic fiber if an expensive material, and these coatings are dense and therefore use a relatively great quantity of fibers.

Additionally, these coatings generally fail to satisfactorily meet the requirements of a protective coating: good adhesion to the substrate and resistance to severe thermal shock combined with good chemical resistance. These coatings often crack and peel off the substrate, especially under thermal shock conditions.

Many of the problems associated with the prior art are overcome to a substantial extent by the practice of the invention.

SUMMARY OF THE INVENTION

The present invention is directed to a fiber-free refractory composition for coating a ceramic fiber substrate consisting essentially by weight of 0 to 46.2% of an aluminosilicate mineral selected from the group consisting of kyanite, andalusite and sillimanite; 17.6 to 60.0% alumina; 2.9 to 5.7% colloidal silica; and 22.9 to 66.4% water. This mixture is characterized by good adhesion to substrate material, and excellent resistance to thermal shock and chemical attack through a wide range of firing temperatures up to 3000° F. The specific values of the components of the coating are selected to match the thermal expansion or shrinkage of the substrate.

DESCRIPTION OF THE PREFERRED EMBODIMENTS

Table 1 lists various values of the constituents of the invention which experimentally were found suitable to coat substrates of different thermal expansion or shrinkage characteristics.

TABLE 1

| Test No. | Alumino-silicate % | Alumina % | Colloidal Silica % | Water % | Coefficient of Expansion |
|---|---|---|---|---|---|
| 5 | 0.0 | 51.0 | 3.1 | 45.9 | Very Negative |
| 6 | 0.0 | 30.7 | 2.9 | 66.4 | Negative |
| 25 | 11.4 | 60.0 | 5.7 | 22.9 | Neutral |
| 4 | 15.9 | 31.8 | 4.8 | 47.5 | Positive |
| 24 | 23.1 | 49.1 | 4.6 | 23.2 | Positive |
| 3 | 31.1 | 17.6 | 4.7 | 46.6 | Very Positive |
| 23 | 34.6 | 37.6 | 4.7 | 23.1 | Very Positive |
| 20 | 46.2 | 26.1 | 4.6 | 23.1 | Very Positive |

The table is arranged in increasing levels of the aluminosilicate constituent. The coefficient of expansion terms of negative and positive refer to the thermal shrinkage and expansion behavior of the substrate. The experimental values given for the coating composition were determined for compatability with this behavior and adhesion to the substrate.

A composition that has proved particularly successful in tests was applied to a ceramic fiber module fabricated from a combination of aluminosilicate and high-alumina fiber, and organic binders. One such ceramic fiber module is the Unifelt 3000 module manufactured by The Babcock & Wilcox Company, assignee of this invention. This module typically consists by weight of 71.7% alumina, 2.8% silica, and 5.5% loss-on-ignition. The aluminosilicate fiber is for example Kaowool ceramic fiber manufactured by The Babcock & Wilcox Company; the high alumina fiber is for example Saffil alumina fiber manufactured by Imperial Chemical Industries.

A coating tailored to the above described module consists essentially by weight of 11.4% kyanite, 60.0% alumina, 5.7% colloidal silica, and 22.9% water (Test No. 25).

The kyanite has a sieve size of minus 200 mesh, i.e. only material which passes through a 200 mesh screen is used.

The alumina is a polycrystalline alpha alumina. In the preferred embodiment, 34.2% by weight of the total wet mixture is a minus 200, plus 325 mesh alumina grain, i.e. alumina that is smaller than 200 mesh and larger than 325 mesh. An example of such an alumina is T-61 alumina, a commercial alumina product manufactured by Alcoa. Likewise, in the preferred embodiment, 25.7% by weight of the total wet mixture is a minus 325 mesh alumina, such as A-2 alumina, a commercial alumina product manufactured by Alcoa.

An example of a colloidal silica is Ludox HS-40, a colloidal silica dispersion manufactured by DuPont. This dispersion is an aqueous suspension of sodium stabilized silica particles of 40 weight percent solids. The colloidal silica acts an an inorganic binder which holds the other material together and functions as a bonding agent to insure a good bond between substrate and coating.

The kyanite, alumina, and colloidal silica are mixed together. Water is then added to the mixture, and the resulting coating is applied to the fiber substrate by trowelling, spraying, or dripping. After air drying, the coated module is ready for use.

A first test panel was coated with the coating described above and placed inside of a gas furnace. Upon firing, the furnace and panel were rapidly heated to 2500° F., after which the panel was removed from the furnace and exposed to a blast of cold air to shock the coating. The procedure was repeated on a 10 minute cycle. After 25 such cycles, the coating proved to be intact and had not cracked or flaked off the substrate. Prior art coatings tested under the same conditions failed after only two cycles. Thus the composition in accordance with the present invention has very good thermal shock resistance.

A thickening agent may optionally be added to the composition, preferably about 0.2% by weight of the total wet mixture. Some examples are methycellulose, starch, gums, and clays. The thickener simply affects the consistency of the coating, and is neither critical to nor necessary for the invention.

Suitable substitutes for the colloidal silica include ethyl silicate, such as tetraethyl orthosilicate, tetraethoxysilane, ethyl orthosilicate, silicate polymers, ethyl polysilicate, ethoxypolysiloxane; and colloidal alumina, such as aluminum oxide sol.

The beneficial characteristics of the fiber-free coating of the present invention are especially unexpected in view of the different shrinkage and expansion characteristics of the aluminosilicate aggregate of the present invention to match and adhere to the substrate in comparison to the ceramic fiber of the prior art.

While the composition described above as a preferred embodiment is tailored for a particular ceramic fiber module, modification of the constituents of the fiber-free coating allows for adoption of such coatings to other ceramic fiber modules having different expansion or shrinkage factors or different temperature ratings. As an example, for a module with a somewhat lower temperature rating (lower weight percent of high alumina ceramic fiber) than the module composition described above, the amount of kyanite present in the coating composition may be reduced to provide a composition thermally compatible with the substrate of the lower temperature module.

We claim:

1. A fiber-free refractory coating composition for a ceramic fiber insulation for use as a high temperature lining which consists essentially of a ceramic fiber substrate and a coating of the coating composition, said coating composition consisting essentially by weight of 0 to 46.2% of an aluminosilicate mineral selected from the group consisting of kyanite, andalusite, and sillimanite; 17.6 to 60% alumina; 2.9 to 5.7% colloidal silica; and 22.9 to 66.4% water and wherein said ceramic fiber substrate consists essentially of aluminosilicate fiber, high-alumina fiber and organic binders.

2. A fiber-free refractory coating composition for a ceramic fiber insulation for use as a high temperature lining which consists essentially of a ceramic fiber substrate and a coating of the coating composition, said coating composition consisting essentially be weight of 11.4% of an aluminosilicate mineral selected from the group consisting of kyanite, andalusite, and sillimanite; 60% alumina; 5.7% colloidal silica; and 22.9% water and wherein said ceramic fiber substrate consists essentially of aluminosilicate fiber, high-alumina fiber and organic binders.

3. A process for producing a ceramic fiber insulation having a ceramic fiber substrate and a coating of a fiber-free refractory coating composition for use as a high-temperature lining characterized by good adhesion to a substrate material and excellent resistance to severe thermal shock and chemical attack, comprising the steps of:

mixing together an aluminosilicate mineral, alumina, and colloidal silica, the aluminosilicate mineral selected from the group consisting of kyanite, andalusite, and sillimanite;

adding water to the mixture to form an aqueous mixture;

then applying a coating of the aqueous mixture to the ceramic fiber substrate, wherein said ceramic fiber substrate consists essentially of aluminosilicate fiber, high-aluminum fiber and organic binders; and drying the mixture on the substrate.

* * * * *